June 2, 1953

R. L. PIGFORD 2,640,355

BALLISTICS TESTING INSTRUMENT

Filed April 14, 1950

Inventor
Robert L. Pigford

By G. J. Kessenich, J. H. Church & A. W. Dew
Attorneys

Patented June 2, 1953

2,640,355

UNITED STATES PATENT OFFICE 2,640,355

BALLISTICS TESTING INSTRUMENT

Robert L. Pigford, Newark, Del., assignor, by mesne assignments, to the United States of America as represented by the Secretary of the Army Application April 14, 1950, Serial No. 155,909

19 Claims. (Cl. 73—167)

This invention relates to machines for testing the ballistic characteristics of spinning projectiles. The determination of the numerous variables which affect the performance of projectiles in flight, particularly those of the liquid-filled chemical type, is difficult. Computations based on theory alone, while helpful, are exceedingly complex and often unreliable in the prediction of actual performance. It is also possible to make quantitative determinations of the period of yaw near the gun. However, the motion of the projectile at this location is of minor interest. The principal quantities which must be determined for accurate prediction are range and deviation of a given projectile from the vertical plane of fire. However, significant measurements of range and deflection are difficult to obtain because they require statistical analysis of a large number of trials or experiments and, particularly in the case of projectiles of larger calibers, are very costly.

For the foregoing reasons, the most practicable method of determining the flight characteristics of projectiles are laboratory investigations under carefully controllable conditions and highly accurate measurements. This is true for liquid filled projectiles, such as those of the chemical type, as well as for those of the solid type.

It is therefore the general object of my invention to provide a testing machine in which a full-size projectile closely simulating the actual projectile in size, weight, location of center of gravity, and moment of inertia, can be mounted, spun at speeds closely equal to the actual speed of spin of the corresponding projectile in flight.

More particularly, it is an object of the invention to mount the simulated projectile for universal angular movement about transverse axes through its center of gravity while spinning, and to apply external forces to the universally mounted spinning projectile representing and closely simulating the actual aerodynamic forces which act on the real projectile in flight.

A further object is to closely simulate the conditions existing during actual flight of the projectile occurring along a curved trajectory by applying an overturning moment to the spinning simulated projectile and causing the line of action of the applied moment to rotate about the projectile's center of gravity at a rate equal to the angular velocity of the tangent to the trajectory of the corresponding real projectile.

A still further object is to provide a precision instrument wherein means are operable to simulate the condition where the projectile's axis does not follow the tangent to its trajectory as this tangent turns during flight, by continuously angularly moving the device applying the external force to the simulated projectile to thereby correspondingly angularly move the line of action of the thrust exerted thereby.

Another object is to provide an instrument of the type mentioned wherein the aforesaid overturning moment can be varied during the investigation of the performance of a proposed projectile to represent the condition caused principally by decrease in the velocity of flight as the projectile approaches the vertex or zenith of its path.

Still another object is to provide an instrument of the type identified which is of value in testing and determining the arming and operating characteristics of the fuzes of rotating projectiles.

A further object is the provision of an instrument in which the angular position, speed of rotation, and rate of angular movement of the simulated projectile can be recorded and subsequently determined with a high degree of accuracy.

Another object is to provide a flight-simulating and projectile-testing instrument which is rugged, reliable and highly accurate in the determination of characteristics which will enable reliable prediction of the flight performance of the corresponding actual projectile.

Other objects and advantages of the invention will occur or be obvious to those skilled in the art after a study of the following specification in connection with the accompanying drawing, wherein:

Figures 1, 13:
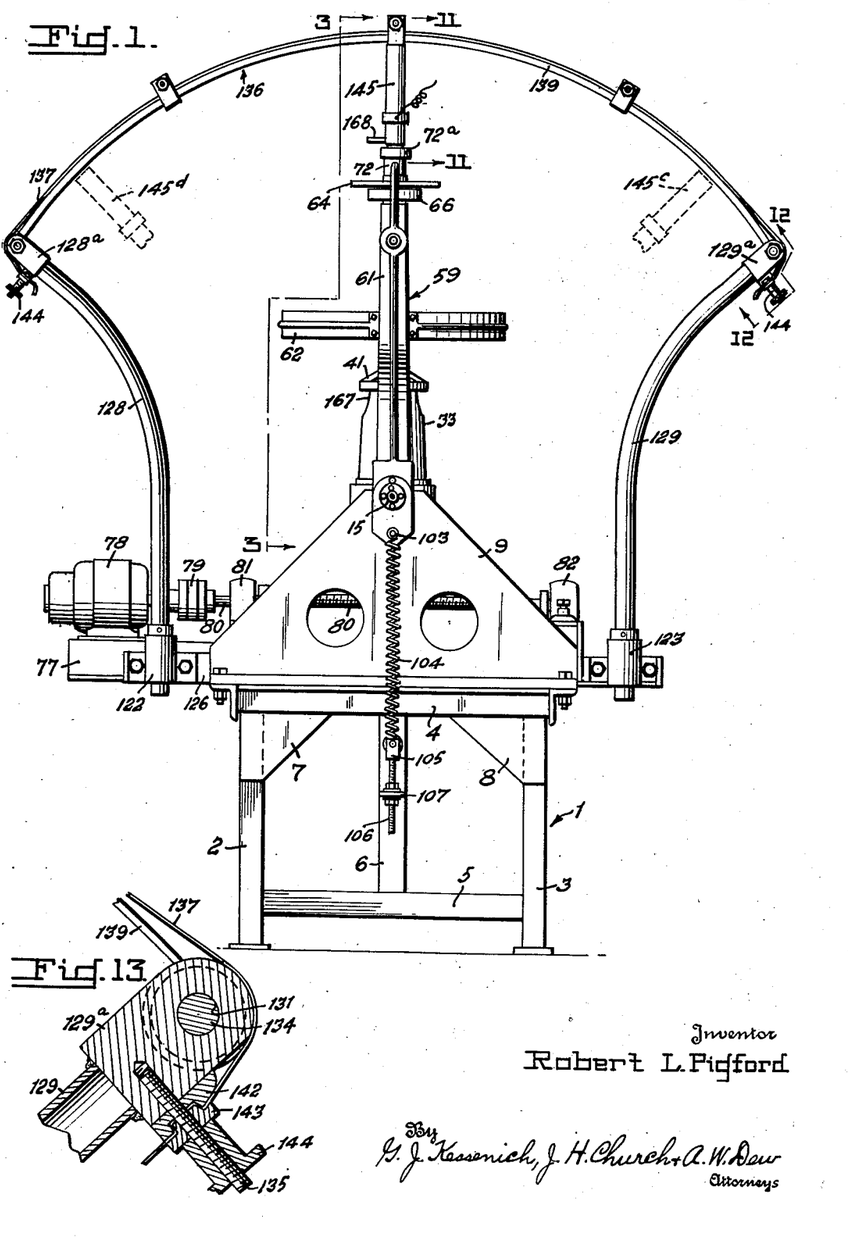
Figure 1 is an elevational view of the entire instrument.
Figure 13 is a section taken in a plane indicated by line 13—13, Figure 12.

Referring to the drawing, the numeral 1 indicates generally a support or table comprising four legs such as 2 and 3, Figure 1, rigidly braced by spaced horizontals 4 and 5, verticals 6, and gusset plates 7 and 8. All sides of the stand may be of the same construction as shown upon Figure 1 having its parts rigidly united by bolts or welding. A pair of horizontally spaced, generally triangular parallel upright brackets 9 and 10 have flat bases which extend across and are bolted at their ends, as at 11, Figure 4, to two of the horizontal brace members 4. These brackets are formed with integral sleeve bearings 9a and 10a at their tops and central vertical bracing flanges 9b and 10b. The brackets may be duplicates and are fixed to table 1 with the axes of their bearing sleeves in alignment to define a normally horizontal axis.

A liner 12 fits sleeve 9a and has an enlarged inner end 12a having a counterbore supporting an antifriction bearing 13, and a flanged outer end 12b, Figure 3, bolted to a portion of the pivoted bail subsequently described. The inner race of bearing 13 supports a tube section 14 having a smooth substantially air-tight fit about the reduced end of an air supply pipe 15 whose outer end projects through and is fixed to flange 12b. A flexible air hose not shown is clamped to the projecting end of tube 15 whereby air under pressure for spinning the rotor, subsequently described, is conducted to the interior of the hollow gimbal ring 16 without substantial loss.

Figures 4, 5:
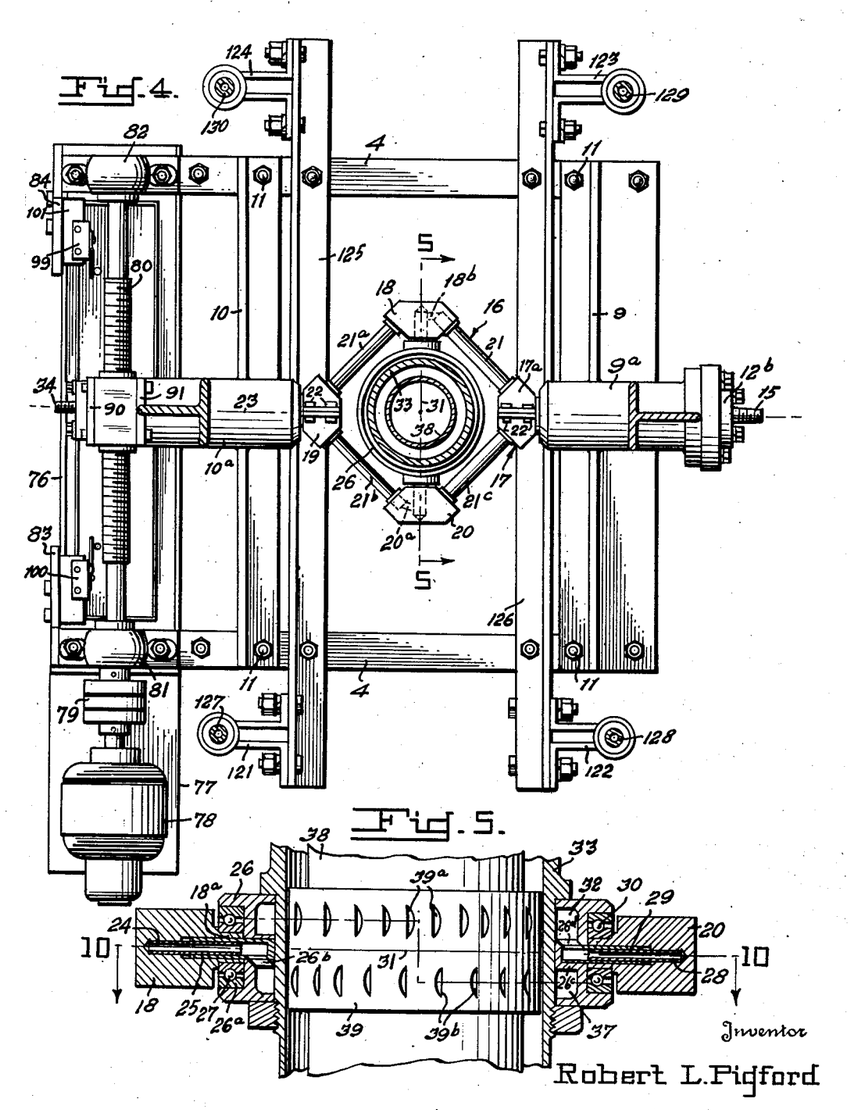
Figure 4 is a sectional plan view taken in a plane indicated by the line 4—4 of Figure 3.
Figure 5 is a sectional detail view to an enlarged scale taken in a plane identified by line 5—5 of Figure 4 and showing the bearing construction by which the rotor casing is journaled in the gimbal ring.
Figures 10, 15:
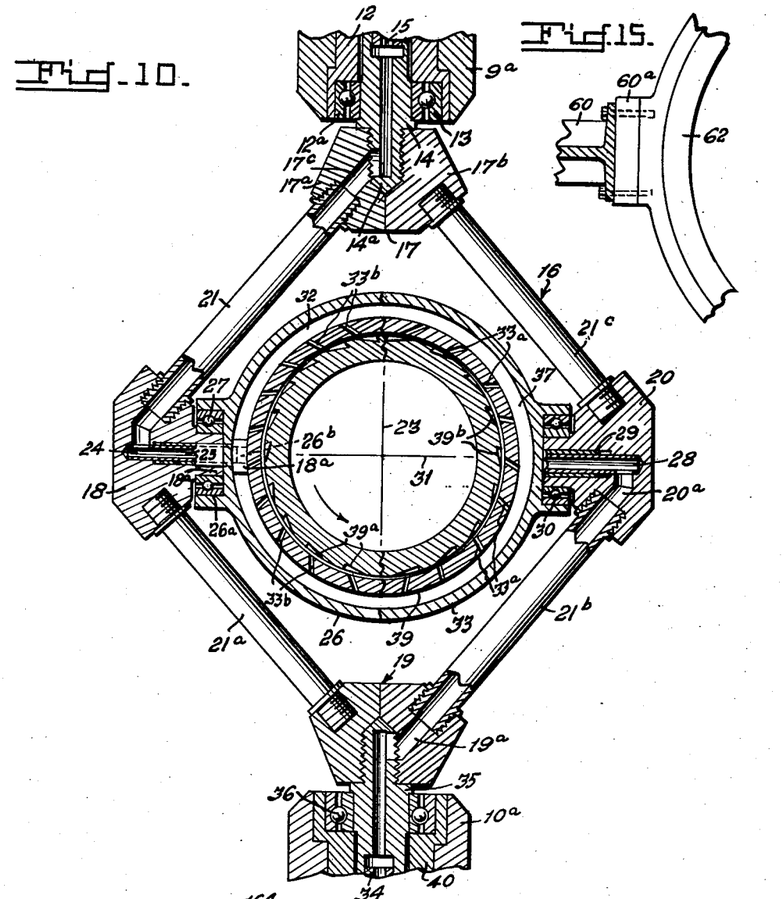
Figure 10 is a sectional view on the line 10—10 of Figure 5 showing the rotor construction and dual air jet means by which the rotor may be spun for a test and then rapidly braked.
Figure 15 is a detail view to an enlarged scale, taken upon line 15—15 of Figure 3.

The gimbal ring 16, as best shown in Figures 4 and 10 is a built-up feature, generally rectangular in outline and comprising four fittings 17, 18, 19 and 20 interconnected by short pipe sections 21, 21a, 21b, and 21c. Fittings 17 and 19 are duplicates and each consists of two identical flanged sections such as 17a and 17b, Figure 10, having their flanges secured together by bolts 22. See Figure 6. Each section has a threaded opening for the reception of a respective pipe section. Thus fitting 17 has the ends of pipe sections 21 and 21c threadedly connected therewith. Furthermore, the sections when bolted together form a threaded receptacle for the reception of inner threaded end 14a, Figure 10, of tube section 14.

Figures 2, 11, 12, 16:
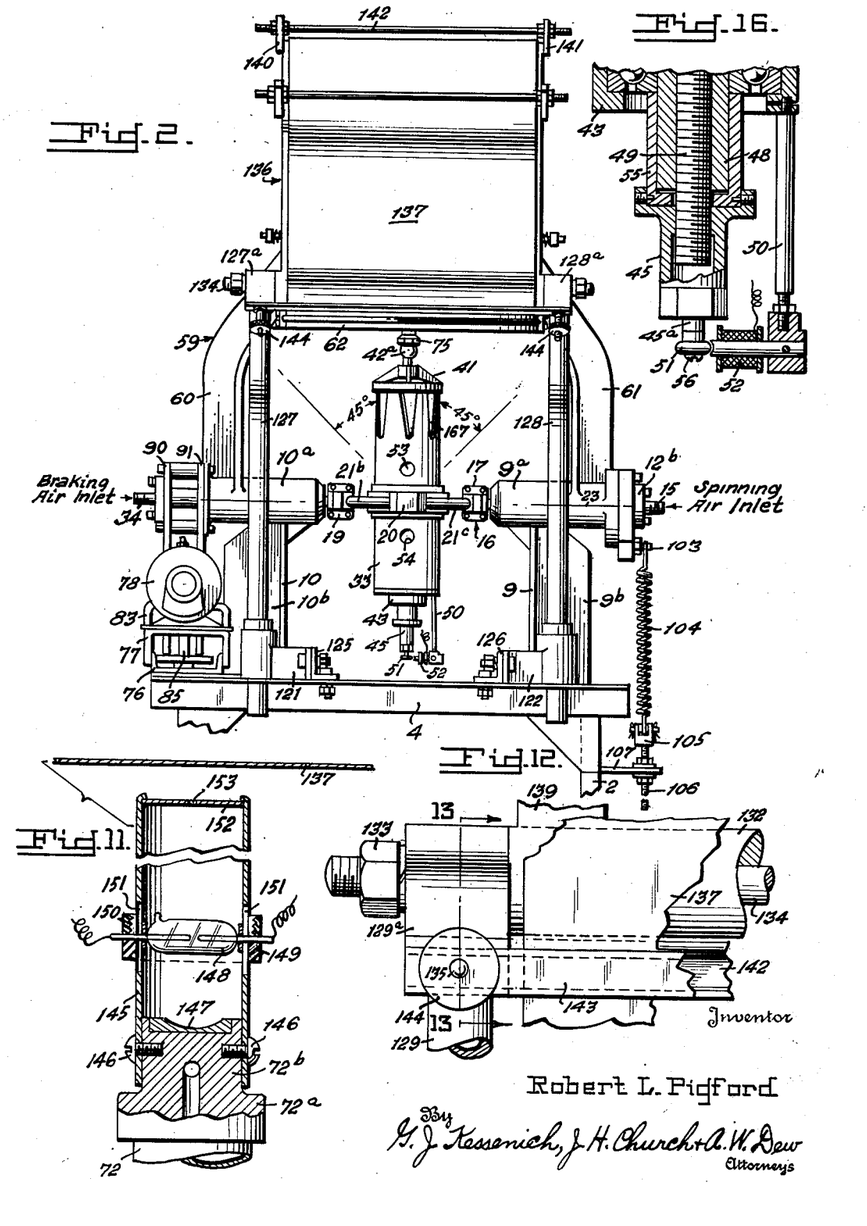
Figure 2 is an elevational view as seen from the left in Figure 1, portions of the supporting frame being broken away.
Figure 11 is a section on line 11—11, Figure 1, showing details of the light projector of the recording mechanism.
Figure 12 is a detail of one of the recording paper supports and clamps as indicated by line 12—12, Figure 1.
Figure 16 is a view to an enlarged scale of the lower portion of the rotor casing, showing in greater detail the pick-off for determining rotor speed.

The diametrically opposite fitting 19 is a duplicate of the one just described and is similarly journaled in an antifriction bearing 36, whereby gimbal ring 16 is journaled for pivotal movement about an outer, normally-horizontal axis 23, Figures 2, 4 and 10.

The parts carried by sleeve 10a, previously mentioned, may be identical with the described parts carried by sleeve 9a. It will therefore be sufficient, referring to Figures 3 and 10, to identify liner 40, air lead-in pipe 34, tube section 35 and antifriction bearing 36. A port 19a connects the interior of fitting 19 with pipe 21b and this pipe, within fitting 20, connects with a passage 20a leading to air tube 28 and thence to the chamber 32 by way of port 26e, Figure 5. Air supply pipes 15 and 34 may be connected to a common source of air under pressure and control valves are inserted into the supply lines so that either pipe may be supplied with air. In the manner subsequently described, air is supplied to pipe 15 when it is desired to spin the rotor during a test. Then, at the finish of a run, air to pipe 15 is cut off and the valve leading to pipe 34 is opened to bring the rotor quickly to rest.

The fittings 18 and 20 are duplicates. Fitting 18 will be described. This consists of a single part having two threaded bores at substantially 90° to each other, to receive the threaded ends of pipe sections 21 and 21a. From Figures 4 and 10 it will be noted that this fitting has a central bore in which one end of an air tube 24 is secured. This tube projects with a smooth fit and close tolerance into the projecting end of a tube 25 fixed and projecting from a supporting ring 26. A cylindrical recess 26a in this ring accommodates the outer race of a ball bearing 27 whose inner race fits a projection 18a of part 18. Tube 25 has a smooth close fit within a tubular space between tube 24 and a counterbore in fitting 18. The construction at the diametrically opposite side of ring 16 is substantially identical with that just described so that, referring to Figures 5 and 10, it is sufficient to identify fitting 20, ring 26, interfitting air tubes 28 and 29 rigid with fitting 20 and ring 26, respectively, and ball bearing 30. In this manner, ring 26 and the parts supported thereby are journaled for movement relatively to gimbal ring 16 about an inner gimbal ring axis 31, Figures 4 and 5, and are mounted for universal angular movement relatively to frame 1.

The ring 26 has an air-tight fit about rotor casing 33 and is hollow, as clearly shown in Figure 5. A partition 26c, Figure 5 extends radially inwardly midway between the top and bottom of the ring into close fitting contact, through 360°, with the wall of casing 33, and acts to divide the hollow interior of the ring into two separate upper and lower annular chambers 32 and 37, respectively. From Figure 5 it will be noted that there is a passageway 26b leading from the end of tube 25 to chamber 37, while, at the diametrically opposite side, a passageway 26d connects tube 29 with chamber 32.

Rotor 38 will subsequently be described in detail but for the present, it is desired to point out that it has a circumferential thickened turbine section 39 fixed about its mid-section provided with upper and lower sets of oppositely facing spaced air pockets 39a and 39b in its periphery. A series of equally-spaced tangential holes 33a extend about the rotor through 360° and lead from chamber 37 through the wall of casing 33 to form air jets impinging upon pockets 39b to spin the rotor in the direction of the arrow, Figure 10.

A second series of tangential holes 33b through the wall of casing 33, lead from chamber 32. The holes 33b are oppositely directed from holes 33a and, when supplied with air under pressure, form jets impinging on pockets 39a to brake the rotor and bring it quickly to rest.

Pipe 15 is connected by flexible tubing with a source of air under pressure, not shown. A port 17c from fitting 17 to pipe section 21, conducts air to fitting 18, through port 26b, and thence to chamber 37, as previously described. On the other hand, a port 19a from fitting 19 leads into pipe section 21b and thence to fitting 20, thence through ports 20a and 26d, to chamber 32, as also previously described.

Figures 3, 9:
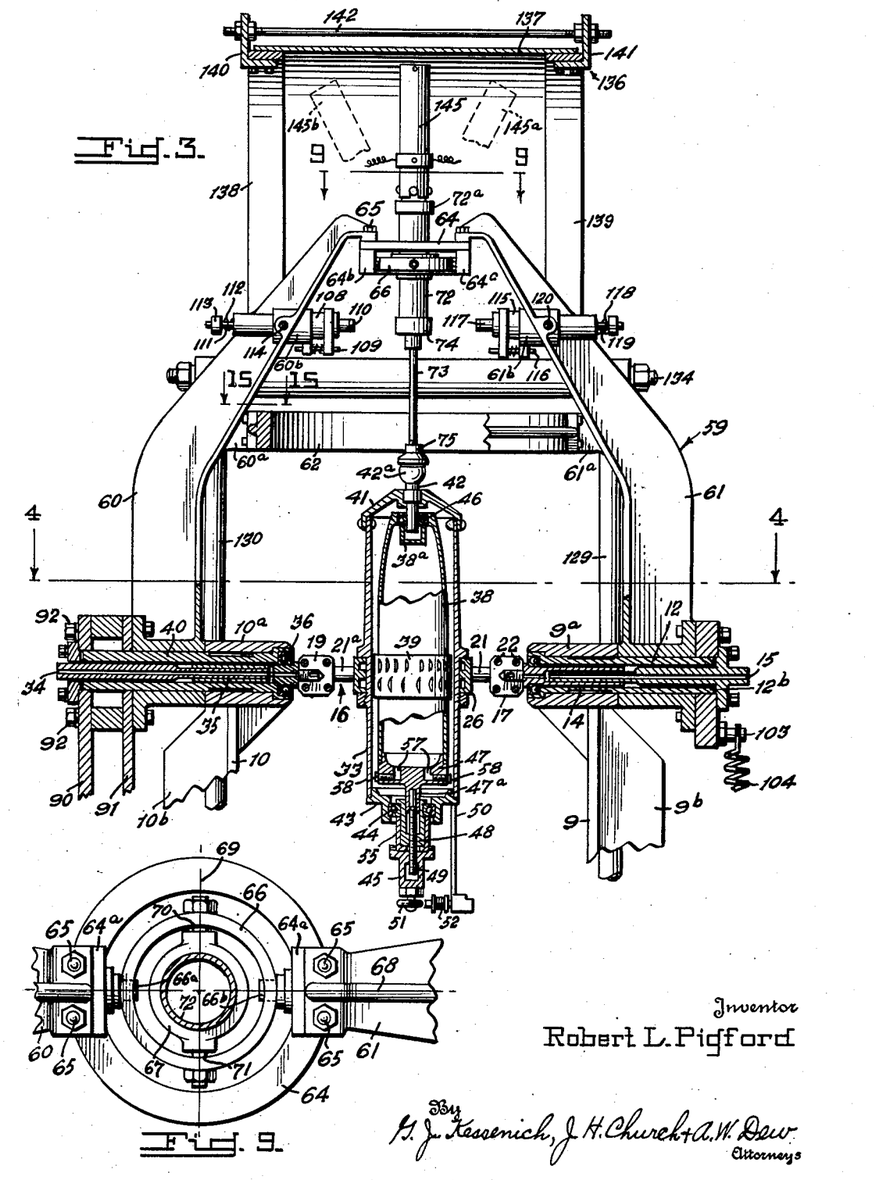
Figure 3 is a sectional elevation as indicated by the line 3—3 of Figure 1.
Figure 9 is a sectional view taken in a plane identified by the line 9—9 of Figure 3 showing in detail the universal gimbal mounting of the force-exerting means in its pivoted bail.

An air pipe 34, Figures 2, 3 and 4, corresponding to pipe 15, has an external projecting portion adapted for connection with a flexible tube, not shown, in turn connected with the source of air under pressure. Conveniently located valves (not shown) in each of the pipe connections leading to tubes 15 and 34, respectively, enable the rotor to be spun or rapidly brought to rest, as desired. Furthermore, by means of a stroboscopic speed indicator, subsequently described, the air pressure to pipe 15 may be regulated so that the rotor spins at a speed closely equal to the speed of rotation in flight, of the actual projectile which the rotor simulates. From Figure 5 it will be noted that the clearance between band 39 and casing 33, is small.

The casing 33 is a hollow, generally cylindrical element having a nose cap 41 riveted or bolted thereto. This cap has a stub shaft 42 secured in its central aperture and carries a ball 42a integral with its outer end. The lower end of casing 33 is closed by a cup 43 having a circular recess to accommodate an antifriction bearing 44. Cup 43 also has a depending reduced portion 43a to which a lower bearing 45 is affixed.

The rotor 38 and its turbine ring 39 have previously been mentioned. This rotor is modified in size and shape to correspond with the size, shape, weight, and moment of inertia, of the actual projectile whose flight characteristics it is desired to determine. Departure from precise duplication with the actual projectile involves, generally, (1) the provision of a central circular depression 38a at the nose of the rotor to provide a seat or recess for antifriction bearing 46, (2) the attachment of turbine ring 39 and (3) the provision of portions depending from part 47 closing the lower end of the rotor. These last-mentioned portions include a short depending stub shaft 47a which has a smooth fit within bearing sleeve 48. Sleeve 48, in turn, passes through the inner race of antifriction bearing 44 and has a flanged upper end resting on this race. See Figure 3. The lower end of sleeve 48 has a smooth fit within a sleeve 55 whose lower end, in turn, fits an upwardly-facing depression in a cup or nut 45. See Figure 16. A threaded shaft 49 has a smooth upper end pinned within a bore in shaft 47a and passes with threaded engagement through central apertures in sleeve 48 and cup 45. The upper end of sleeve 55 bears against the lower surface of the inner race of bearing 44 and by turning nut 45 on shaft 49, sleeve 55 is forced upwardly to take up any axial play between its upper end, the inner race of bearing 44, and the flanged upper end of sleeve 48. Since shaft 49 is pinned to shaft 47a the rotor is held against axial movement relatively to casing 33. The lower end of cup 45 is formed to receive a wrench. A central lug 45a has a threaded aperture receiving a screw 56 which acts to rigidly secure a magnet 51 of "Alnico" to the cup. Thus shaft 49, sleeves 48 and 55, cup 45 and magnet 51, rotate as a unit with rotor 38. Symmetrically disposed apertures 57 are provided in plug 47, each closed by a removable screw 58 to enable the rotor to be filled with liquids or fluent material having the same properties, namely, specific gravity and viscosity, as those used to fill the actual projectile.

A rod 50 depends from casing 33 and carries a small electromagnet 52 in cooperative relation with magnet 51 so that, as rotor 38 spins, an alternating E. M. F. of the same frequency as the speed of the rotor, is induced in the electromagnet and utilized to determine rotor speed in a manner subsequently explained. Casing 33 has two sets of holes 53 and 54 equally-spaced above and below ring 26 to discharge spent air. These holes are arranged so that there is no net external moment on the casing due to reaction of the air emerging therefrom.

In accordance with the principles and purpose of may invention, means are provided to exert a thrust on the nose or forward end of the casing 33 to simulate by a single force, the forces exerted on the actual projection in flight by air resistance. In the model shown, this means includes a bail generally identified by the numeral 59. This bail is built up from parts including upwardly and inwardly-extending arms 60 and 61 rigidly united intermediate their ends by a ring 62 bolted at diametrically opposite locations to flanged projections 60a and 61a, Figure 3, and as shown in detail for arm 60 upon Figure 15. Arms 60 and 61 are journaled on liners 40 and 12, respectively, whereby the bail may be swung about axis 23.

At the top, arms 60 and 61 have their ends bent inwardly and rigidly connected by a second ring 64, Figure 9, having diametrically opposite flanged portions 64a bolted as at 65 to the mating flanges formed upon the ends of arms 60 and 61. Diametrically opposite lugs 64b and 64c, Figure 3, depend from ring 64 and carry aligned bearings defining a normally horizontal axis parallel with axis 23. A small gimbal ring 66 has aligned trunnions 66a and 66b projecting therefrom and journaled in the respective lugs 64b and 64c.

A collar 67 is journaled by bearings 70 and 71 in ring 66 for pivotal movement about an axis 69 at right angles to axis 68. This collar has an air cylinder 72 rigidly mounted therein. A piston, not shown, fits cylinder 72 and is connected with a rod 73, Figure 3, which passes through a cap 74 threaded upon the lower end of the cylinder. A nut 75 is threaded upon the lower end of rod 73 and has a generally hemispherical cavity fitting ball 42a. By this construction, as air under pressure is admitted to cylinder 72 above the piston therein, nut 75 is urged downwardly and exerts a force on ball 42a. This force is constant for angular positions of the casing 33 and of bail 59, relatively to frame 1, so long as the air pressure in cylinder 72 remains constant. The force thus applied is as near as possible in value to the air resistance encountered by the actual projectile in flight and can be maintained constant with constant air pressure in cylinder 72, or varied to simulate conditions caused by decrease in velocity of the projectile. By swinging bail 59 about the axis 23, it is possible to simulate the conditions occurring along a curved trajectory of an actual projectile since the line of action of the overturning force can be rotated about the center of gravity of the simulated shell at a rate equal to the angular velocity of a tangent to the actual trajectory. If the spinning axis of the actual projectile does not follow or remain parallel to the tangent to the trajectory as this tangent turns, the resultant wind resistance is applied to the projectile's nose along a line making some angle with the longitudinal axis of the projectile. Such a condition is accurately simulated by the present instrument when the spinning axis of rotor 38 does not maintain alignment with rod 73 as bail 59 is swung about axis 23.

Power means are provided to automatically swing bail 59 about axis 23 at a rate varying as the square of the cosine of the angle which the bail makes with the vertical plane through such axis during a time interval corresponding to the time of flight of the actual projectile for a predetermined range. This means comprises a horizontal upwardly-facing channel section 76 secured to and extending over and across the ends of horizontals 4, as clearly shown in Figure 4. One end of channel 76 projects outwardly from its horizontal and has secured thereto a second, downwardly-facing channel section 77 forming a base for a constant-torque, variable-speed motor 78 of fractional horsepower. This motor is directly connected by a flexible coupling 79 with a threaded shaft 80 journaled in self-aligning, roller bearing pillow blocks 81 and 82 bolted to U-shaped brackets 83 and 84, respectively. These brackets are secured to the sides of channel 76, as clearly shown at Figure 8 for bracket 84.

Figures 6, 8:
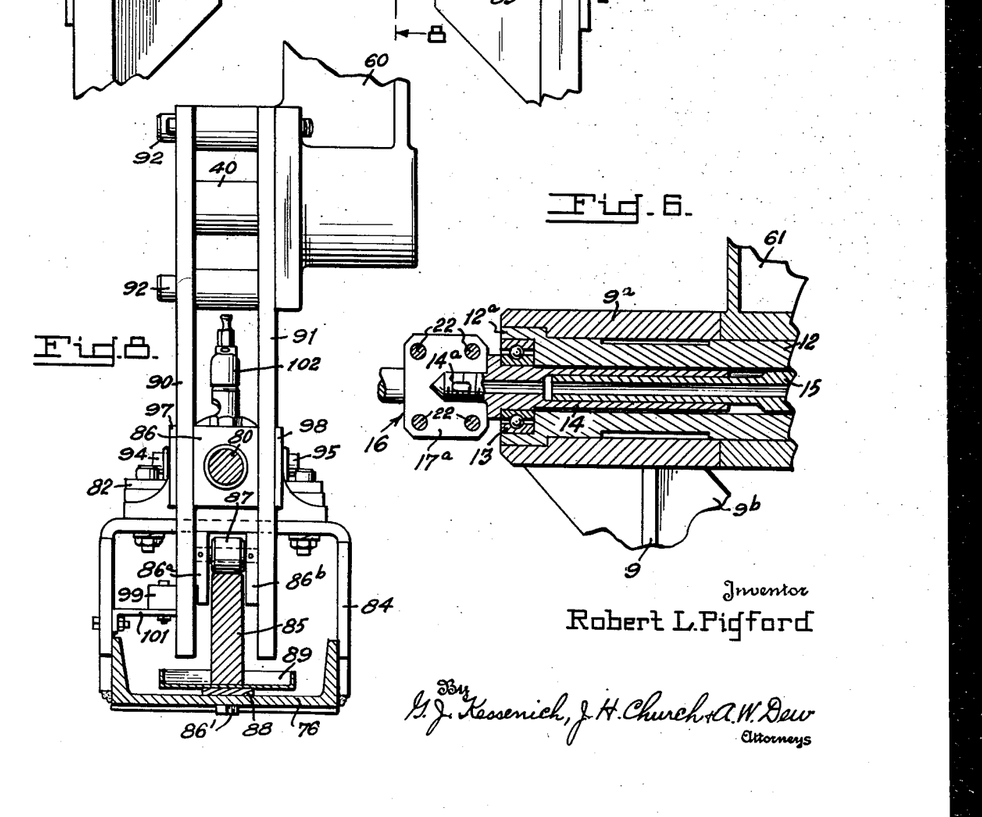
Figure 6 is a detail sectional view to an enlarged scale of a portion of Figure 3, showing one of the bearings by which the gimbal ring is mounted and by which air under pressure is conducted to the interior of the gimbal ring to spin the rotor.
Figure 8 is a sectional detail view taken in a plane indicated by the line 8—8 of Figure 7.

An elongated straight track or guide 85 is secured, as by screws 86', Figure 8, centrally of channel 76. A nut or rider 86 has threaded engagement with shaft 80 and includes downwardly-extending fingers 86a and 86b embracing opposite sides of the track and a roller 87 journaled between the fingers on a horizontal axis and riding upon the top of the track. In this manner, the nut or rider 86 is prevented from rotating and is translated, with very little friction, in response to rotation of shaft 80 by motor 78. A spacer strip 88 and an oil pan 89, to catch any excess lubricant, are interposed between track member 85 and channel 76.

Figure 7:
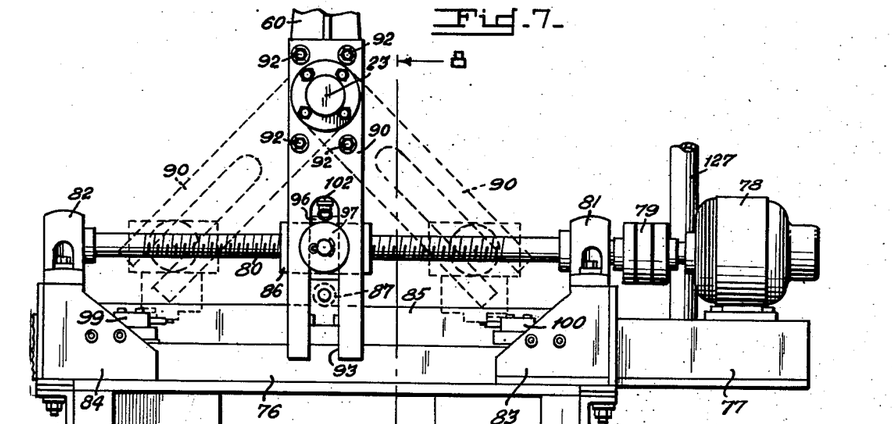
Figure 7 is a detail elevation of the power drive for pivoting the force-exerting means to simulate the forces acting on an actual projectile during flight.

As best shown in Figures 2, 3, 7 and 8, a pair of axially-spaced parallel levers 90 and 91 are rigidly attached, as by bolts 92, to the arm 60 of bail 59, to extend downwardly from axis 23. These levers have co-extensive slots 93, Figure 7, in their lower ends, radial of axis 23. Aligned pintles 94 and 95 extend from the respective sides of nut 86. Guide blocks, such as 96, Figure 7, are journaled on the respective pintles and have straight parallel sides each fitting within a corresponding one of the slots 93 of levers 90 and 91. Washers 97 and 98 are mounted upon the respective pintles and span the slots 93. These washers are held in place by cotter pins and prevent excessive axial movement of the guide blocks upon the pintles, by the construction just described, rotation of motor 78 effects pivotal movement of bail 59 about axis 23, at an angular velocity which is proportional to the square of the cosine which the bail makes with the vertical plane through axis 23.

Thus, let
$c$ = the vertical distance from axis 23 to the axis of screw 80 (a constant of the instrument)
$r$ = R. P. S. of motor 78 (a constant for any given test run)
$p$ = pitch of threads of shaft 80 (a constant of the instrument)
$t$ = time in seconds from the start of a test run with bail 59 vertical
$\theta$ = the angle which bail 59 makes with the vertical at any given instant Then the total displacement of nut 86 from central position at time $t$ is $rpt$, and $$\tan \theta = \frac{rpt}{c} \qquad (1)$$

$$\cos \theta = \frac{c^2}{(c^4 + r^2p^2t^2)^{\frac{1}{2}}} \qquad (2)$$

$$\theta = \text{arc } \cos \frac{c^2}{(c^4 + r^2p^2t^2)^{\frac{1}{2}}} \qquad (3)$$

Differentiating (3)—

$$d\theta = d\left[\frac{\frac{c^2}{(c^4+r^2p^2t^2)^{\frac{1}{2}}}}{\frac{rpt}{(c^4+r^2p^2t^2)^{\frac{1}{2}}}}\right] = \frac{-c^2 dt}{c^4 + r^2p^2t^2} \qquad (4)$$

And the angular velocity of bail 69

$$\frac{d\theta}{dt} = -\frac{c^2}{c^4 + r^2p^2t^2} \qquad (5)$$

But $$\cos^2 \theta = \frac{c^4}{c^4 + r^2p^2t^2} = -c^2\left[\frac{-c^2}{c^4+r^2p^2t^2}\right] \qquad (6)$$

Substituting (5) in (6)

$$\cos^2 \theta = -c^2 \frac{d\theta}{dt} \qquad (7)$$

and, letting $$k = -\frac{1}{c^2}$$

$$\frac{d\theta}{dt} = k \cos^2 \theta \qquad (8)$$

In the machine shown, the parts are so dimensioned that bail 59 has a total movement of 45° to each side of the vertical plane through axis 23, as indicated in dotted lines upon Figure 7. Microswitches 99 and 100 are mounted adjacent the respective limits of travel of rider 86 in position so that their operating plungers are actuated by finger 86a when the rider reaches its corresponding limit of travel. In a manner well known in the art and hence not shown in detail, the switches are connected in the circuit of motor 78 to automatically open the same and stop the motor when the bail reaches its limits of angular movement. As shown in Figure 8, switch 99 is mounted on a bracket 101 bolted to bearing bracket 84. The other switch 100, is mounted in an identical manner on bearing bracket 83. An oiler 102 is threaded into rider 86 for lubricating its threads and those of shaft 80.

The arm 61 of bail 59 has a pin 103 fixed thereto in position below axis 23. This pin has one end of a coil spring 104 secured thereto. The other end of the spring is fixed to one end of a yoke 105, Figures 1 and 2, carried by a bolt 106. The bolt passes through a hole in a bracket 107 secured to and extending from brace member 6. Nuts threaded on the bolt on opposite sides of the bracket may be adjusted to vary the tension in the spring which acts to urge the bail into vertical position when displaced therefrom by operation of motor 78, as is obvious from inspection of Figure 1.

In order to centralize cylinder 72, rod 73, and casing 33 and, to positively position the parts prior to the beginning of a test run so that the spin axis of rotor 38 is in alignment with rod 73 and both are in the vertical plane of bail 59, that is, the vertical plane through axis 23, I have provided cylindrical protuberances 60b and 61b on the upper ends of the respective arms of bail 59 which protuberances are aligned when the bail is assembled. Confining attention to bail arm 60, the protuberance 60b has an air cylinder 108 slidably fitting therein and which may be given a slight axial adjustment relatively to the arm by a screw 109 loosely passing through the aperture in a lug integral with cylinder 108, and threaded into an aligned bore in a lug depending from the protuberance.

A piston, not shown, fits cylinder 108 and has aligned rods projecting centrally from its forward and rear faces. The forwardly projecting rod, not shown, has a clamp member 110 secured to its forward end. The forward face of the clamp member is arcuate or V-shaped, to fit about cylinder 72 when forced thereagainst by movement of the piston assembly to the right, as the parts are viewed upon Figure 3. Such movement is opposed by the rod 111 secured to the piston and having a spring 112 thereabout and acting between the adjacent surface of arm 60 and an abutment 113 on rod 111 to urge the clamp member 110 into the retracted position shown upon Figure 3. Compressed air to force the piston to the right to effect engagement of member 110 with cylinder 72, is supplied by way of a flexible hose, not shown, connected with a supply opening 114. The clamping means on arm 61 may be a duplicate of the one just described so that, in addition to protuberance 61b, it will be sufficient to identify cylinder 115, adjusting screw 116, clamp member 117, spring 118 and piston rod 119. Connection with a source of air pressure is made by flexible hose connected to supply opening 120. Any suitable means may be provided to prevent rotation of the pistons and rods within the cylinders. For example, rods 111 and 119 may be non-circular and fit a correspondingly-shaped passageway in the arms. The permissible stroke of each of the pistons is so adjusted that when each is forced inwardly against the head of its cylinder, clamp members 110 and 117 will clamp cylinder 72 and rod 73 in alignment with the spin axis of rotor 38, the axis common to all then being vertical and normal to axis 23. The pressure supply to inlets 114 and 120 may be from the same source as that used to drive rotor 38, either direct or through a pressure-reducing valve, not shown. In any event, when air is admitted to the cylinders 108 and 115, clamp members 110 and 117 are forced inwardly to centralize and align the cylinder 72 and casing 38. On release of air pressure, springs 112 and 118 act to move the clamp members to the release position shown upon Figure 3.

In order to record the motion and position of the simulated shell at any time during a test, an optical system is provided for affording a photographic record. For this purpose, four brackets 121, 122, 123 and 124, Figure 4, are provided. Brackets 121 and 124 are bolted to the ends of an angle bar 125, which, in turn, extends across, and is bolted to, horizontal members 4. In a similar manner, brackets 122 and 123, are bolted to the ends of angle member 126, likewise bolted to horizontals 4 at the side of the rotor opposite member 125. Each of the brackets mentioned includes a flat base for bolting to the vertical face of the angle, and a tubular vertical portion.

Four identical pillars or columns 127, 128, 129 and 130, two of which are clearly shown in Figure 1, have lower vertical portions each fitting within the tubular portion of a respective bracket and secured therein in any desired manner. The upper end of each column is bent in the form of an arc as clearly shown upon Figure 1. The upper end of each column terminates in an integral head such as 129a shown in detail upon Figures 12 and 13. Each head has a transverse bore such as 131, Figure 13. The assembly is such that the heads of columns 127 and 128 which form a pair, have their bores aligned. Likewise, the heads of columns 129 and 130 which form another pair, have their bores aligned. A unitary frame for supporting the light-sensitive recording sheet or strip 137 consists of a pair of spaced parallel tubes of which one, identified at 132, is shown in Figure 12, connected by spaced parallel arcuate straps or bars 138 and 139, Figure 3 having their ends welded to the ends of the tubes. The tubes 132 are of a length to fit between the heads of the columns of a respective pair. A rod 134 is then passed through the aligned bores in the tube and heads, and, in conjunction with nuts 133 threaded on each end of the rod, rigidly secures the parts together. The straps or bars 138 and 139 may be secured together at a number of spaced points therealong (shown as three in the machine illustrated) by a construction shown at Figure 3. Thus, angle brackets 140 and 141 are bolted to the under side of straps 138 and 139, respectively, and have their vertical arms connected by a spacer rod 142 in a manner obvious from inspection of Figure 3. It should be noted, referring to Figure 1, that straps 138 and 139 have their centers of curvature in axis 23, that is the pivotal axis of bail 59.

Each of the heads of columns 127 to 130, carries a screw 135, shown in detail in Figures 12 and 13 for head 129a. A paper-clamping bar 142 has apertures in its ends fitting over the screws 135 of a respective pair of heads. This bar is longitudinally grooved. A second clamping bar 143 is apertured to receive screws 135 and has a rib adapted to fit within the groove of bar 142, as clearly shown upon Figure 13. The strip of photographic paper 137 may then be passed over and in contact at its edges with straps 138 and 139, and secured at its ends by being passed between the clamping bars 142 and 143 and turning down nuts 144 threaded upon the respective screws 135. The recording paper may be in the form of a roll and, after each test or series of tests, a new section may be moved into position by loosening nuts 144 and clamp bar 143, drawing a section of fresh or unexposed paper into position and again tightening nuts 144.

For making a record of the movement of the simulated shell upon paper 137, I have provided a flash lamp projector and circuit control for making a series of light spots upon the paper at equal time intervals. The projector per se is shown generally upon Figures 1 and 3, and in sectional detail upon Figure 11. It comprises a support in the form of a special cap 72a for air cylinder 72 and has an upward extension 72b, Figure 11, about which there fits the lower end of projector tube 145, secured in place by screws 146. A concave mirror 147 is secured within a circular depression in the end of cap 72a. A small flash lamp 148 which may be of the type having its envelop filled with a mixture of xenon and krypton, is secured within tube 145, as by mounting rings 149 and 150 of dielectric material adapted to receive the oppositely-disposed electrodes of the lamp and, at the same time, to grip the outer walls of the tube to hold the lamp in axially adjusted position. Thus, for example, ring 149 may have its upper half externally threaded and reduced in diameter. Circumferentially spaced, axially extending slots are formed in this reduced portion, two of which are diametrically oppositely spaced to receive the electrodes of lamp 148. Internally threaded ring 150 is so formed that when it is screwed onto ring 149 in the position shown, it caused the flexible portions of ring 149, that is, the portions between slots, to clamp the tube 145. Diametrically opposite slots 151 in the wall of tube 145 are provided for adjustment and one of them is enlarged at one end sufficiently to enable the insertion of the lamp into the tube. When it is desired to axially adjust the lamp, ring 150 is loosened, the adjustment made and maintained by re-tightening the ring. An opaque disc 152, having a small central hole 153 therein is held in the upper end of tube 145. As will be noted from Figure 11, the end of tube 145 is closely adjacent the light-sensitive record sheet 137 so that, when lamp 148 flashes for a very brief period, a spot of light is projected onto sheet 137 and when the sheet is developed, appears as a small easily discernible dot. Since the flash lamp and its control circuit per se are well known, the circuit is not shown. A flash rate of the order of 30 times per second will be found generally satisfactory and can be varied as desired.

Magnet 51 and induction coil 52, forming components of the means for determining the speed of rotor 38, have been previously described. These parts are shown upon the circuit diagram of Figure 14. The terminals of electromagnet coil 52, are connected by flexible or pig-tail connections to a socket 154 which may be located in any convenient position on the instrument base. A plug 155 fits socket 154 and is connected to one end of a length of two-wire cable having plug 157 at its other end for insertion into socket 158, the leads from which extend into amplifier 159.

Figure 14:
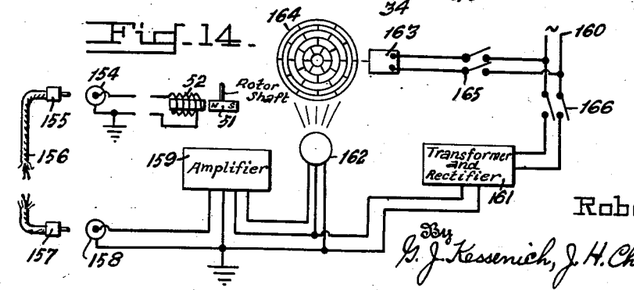
Figure 14 is a wiring diagram of the rotor-speed determining device.

A source of 60-cycle A. C. power, generally identified at 160 supplies a transformer and rectifier 161 which, in turn, supplies plate voltage to amplifier 159 and a flash lamp 162, which may be a 631P1 "Strobotron." Power source 160 is also used to drive an 1800 R. P. M. synchronous motor 163 having a stroboscopic disc 164 on its shaft. As shown, this disc is in position to be illuminated by lamp 162, and has a plurality of concentric rings formed thereon in any suitable manner, five rings being shown. These rings are divided into equal segments by radial lines, the number of segments from center outwardly, being 5, 7, 11, 13 and 17. Thus, for example, where, under a given test, the ring having 7 graduations appears to be stationary and motor 163 is rotating at 1800 R. P. M., the speed of the rotor 38 is known to be 12,600 R. P. M. Or, in general, rotor speed $s=1800m$, where $m$ is the number of divisions of the ring which appears to be stationary. Under this set-up, speeds from 9000 to about 30,000 R. P. M. may be determined. With interpolation, a total of 9 different speeds between the two limits may be determined with reasonable accuracy. Or where a specific speed is required for a given test, the pressure of driving air effective upon rotor 38 is adjusted until the ring corresponding to the desired speed, appears to remain stationary. Other discs graduated with different numbers of divisions per ring may be substituted for the one shown. The speed indicator disclosed is merely by way of example and any other known type of indicator may be substituted so long as it has the required range and accuracy and, in use, does not require the application of external forces to the rotor casing.

The instrument is constructed so that the center of gravity of the assembly including the rotor or projectile 38, casing 33 and parts carried thereby lies at the intersection of gimbal axes 23 and 31. Furthermore, the moments of inertia of the parts are selected so that (1) the moment of the rotor 38 about its spin axis approximates as closely as possible the corresponding moment of the actual projectile under investigation and (2) the combined moment of the rotor, casing, gimbal ring and force-applying cylinder and piston about the transverse axis through the center of gravity of the assembly closely approximates the corresponding moment of the actual projectile. This can be done by making the parts of metals of different specific gravities, by varying the sizes of the component parts and by their arrangement relatively to the axes concerned. It is contemplated that one machine may suffice for the testing of projectiles over a substantial range of calibers.

The instrument shown is a very versatile one and numerous manners of conducting test will occur to those skilled in the art. The following description of one use is therefore by way of illustration only.

At the beginning of a test, the casing 33, rod 73, and cylinder 72 are in alignment in the plane of bail 61, which plane is inclined at about 45° to the vertical about axis 23, as indicated by the dotted lines at 145c, Figure 1. The bail 59 is held in this position by threaded shaft 80, against the centralizing action of spring 104. The valve, not shown, controlling the flow of air under pressure to air pipe 15 is opened. Air under pressure then flows by way of tube 14, fitting 17, pipe 21, fitting 18, and tubes 24 and 25, to chamber 37, from whence it passes through jet orifices 33a, to engage pockets 39b in the rotor and spin the same. Spent air emerges from the casing by way of ports 53, 54 and 187 which are symmetrically disposed so that net reaction force on the casing about each pivot axis thereof, is zero. Motor 163 is started and the amplifier 159 and transformer and rectifier unit 161, are energized by closing switches 165 and 166, Figure 14, respectively. Stroboscopic disc 164 is thereby illuminated by lamp 162 flashing in synchronism with rotor 38. By adjusting the air pressure valve, the rotor speed may be brought to a desired value, which value is attained when the radial lines of the ring on disc 164 corresponding to the desired speed, appears to be stationary. A sheet of photographic paper is positioned with its edges resting upon arcuate bars 138 and 139 and its ends are clamped by the mechanism described in connection with Figures 12 and 13.

With rotor 38 up to test speed, motor 78 and flash lamp 148 are energized. At this time the valve, not shown, controlling the application of air pressure to cylinders 108 and 115, is open so that clamp members 110 and 117 are forced inwardly to centralize and hold cylinder 72 in alignment with the rotor axis. This valve is now closed so that the clamp members, under the influence of their respective springs 112 and 118, are moved to the release position shown upon Figure 3. The valve, not shown controlling the application of air pressure to cylinder 72 by way of flexible hose connected with nipple 168, Figure 1, is now opened to urge the piston within cylinder 72 and its rod 73 downwardly. The valve is so adjusted that the resulting force upon ball 42a and the nose of the simulated shell, will closely approximate the resultant of all the aerodynamic forces which act upon the actual projectile in flight. This force may remain constant during a test without departing greatly from actual flight conditions. Or, if it is desired to more closely represent actual flight conditions wherein the overturning moment decreases as the projectile approaches its vertex, due to decrease in velocity, the pressure may be manually reduced to correspondingly decrease the thrust exerted by rod 73. It is also contemplated that the valve may be controlled automatically during a test to simulate the condition of decreasing velocity.

Motor 78 turns at constant speed and, in the manner previously described, swings bail 59 at the proper rate about its pivot axis 23. At the start of the test, the force exerted by rod 73 upon the rotor casing, is in alignment with the spin axis of the rotor and has no component transverse thereto, thereby correctly simulating the conditions extant as the real projectile leaves the muzzle of the gun; and should the simulated projectile continue to correctly follow the tangent to its trajectory, the rotor spin axis will remain in alignment with the rod 73 and the path defined by the successive flashes of lamp 148, as recorded upon sheet 137, will be an arcuate line intermediate the edges of the sheet and with successive flash-dots spaced in a manner which can be predetermined merely by running a test cycle with cylinder 72 clamped in position by members 110 and 117. This is the condition of no yaw, in which the projectile strikes nose-foremost with its axis tangent to its trajectory.

In actual firing, where the projectile axis does not remain truly tangential to the trajectory, the resistance or force of the relative wind is no longer in alignment with the projectile axis. As a result, the force has a component tending to tilt or further deviate the projectile from a true tangential position. This component, acts, in accordance with well known gyroscopic action, to cause the projectile to precess or yaw in an effort to place its spinning axis in alignment with the deviating component of external force. Since the axis of the deviating component always leads the precession axis by 90°, as in the case of a spinning top, the result may be a "wobble" of the projectile nose of varying radius. All such erratic motions of whatever type or nature, are accurately recorded on sheet 137 and, in the case of component movements about axis 31 are proportional to the deviation of the corresponding dot from the median line of the sheet, while components about axis 23 are proportional to the amounts by which the respective dots lead or lag the corresponding dots of a standard or perfect graph. Since the time of a test is known and is equal to the time of flight of the actual projectile whose characteristics are being investigated, the position of the shell axis at any time relatively to the instantaneous tangent to its trajectory can be readily determined, as well as the rates of yaw and deviation. In short, the major ballistic characteristics of the actual projectile under investigation can be determined and the effects of various changes in construction of the projectile, as well as the effects of changes in gun rifling and powder charge, accurately evaluated. Other uses for the instrument will readily occur to those skilled in the art after a study of the present disclosure. For example, it can be used to test the arming speed and other characteristics of fuzes. The test is terminated when finger 86a, Figure 8, engages one of microswitches 99 or 100 and opens the circuit of motor 78. In a manner well known in the art and hence not shown, manually operable by-pass switches are connected in parallel with each of the microswitches 99 and 100 so that motor 78 can be started despite the fact that one microswitch is open at the beginning of a test. The extreme positions of projector tube 145 at the beginning and end of a test, are indicated at 145c and 145d, Figure 1. Angular movement during a test may be in either direction. The limiting transverse positions of the recorder tube 145 during a test, are indicated in dotted lines at 145a and 145b, Figure 3, and are ample to accommodate the maximum yaw encountered in actual practice.

While I have shown the presently preferred form of the invention, numerous modifications, refinements and substitutions will occur to those skilled in the art after having studied the disclosure. Therefore I desire and intend that the present showing be taken in an illustrative rather than a limiting sense; and I wish to reserve all those modifications falling within the scope of the subjoined claims.

Having now fully disclosed the invention, what I claim and desire to secure by Letters Patent is:

1. In a ballistics testing machine, a rotor simulating in size, shape, and moments of inertia, an actual projectile whose characteristics in flight are to be determined, means mounting said rotor for universal pivotal movement about horizontal axes through its center of gravity, means for spinning said rotor about its longitudinal axis, and means operable to apply a known force having a component parallel to said longitudinal axis, to said rotor at a point on said axis forwardly of said center of gravity.

2. A testing machine as recited in claim 1, and means to move said force applying means to vary at a known rate the angular relation between the line of action of the force exerted thereby and the longitudinal spin axis of said rotor.

3. A testing machine as recited in claim 2, means including a magnet fixed to said rotor to determine the speed of spinning thereof, and means to record the movement of the line of action of the force applied by said force applying means.

4. In a machine for investigating the performance of projectiles, a casing, a simulated projectile having a longitudinal axis and also having substantially the same size, shape, mass, and moments as those of an actual projectile under investigation, means mounting said simulated projectile in said casing for spinning about the longitudinal axis thereof, means carried by said casing for so spinning said simulated projectile, means operable to apply a force to said casing having a component parallel with said axis, and means to angularly vary at a known rate, the direction of said force.

5. In a ballistics testing instrument, a frame, a casing, a gimbal ring mounting said casing on said frame for universal angular movement, a simulated projectile having a longitudinal axis of symmetry and mounted in said casing for spinning about its longitudinal axis fixed with respect to said casing, cooperating means between said casing and projectile for spinning the latter about said axis, means carried by said frame for applying a force to said casing having a component along said axis, and means for automatically varying the direction of said force with respect to said frame.

6. A ballistics testing instrument comprising a frame, a gimbal ring journaled in said frame for pivoting about a first normally horizontal axis, a casing journaled in said ring for pivotal movement about a second axis normal to said first axis, a simulated projectile journaled in said casing for spinning about its longitudinal axis normal to said second axis, all said axes being concurrent at a first point, means carried by said frame for applying to said casing at a second point along said longitudinal axis removed from said first point, a measured force having a component parallel with said longitudinal axis and a component normal to said axis, and means fixed with said frame for automatically and inversely varying said components.

7. A ballistics testing machine as recited in claim 6, said last named means rocking said force-applying means about a normally horizontal axis through the center of gravity of said simulated projectile at an angular rate varying in accordance with a predetermined function.

8. In a ballistics testing instrument, a frame, a rotor casing, means mounting said casing on said frame for universal angular movement about axes transverse thereto, a simulated projectile mounted in said casing for spinning about its longitudinal axis fixed with respect to said casing, cooperating means between said casing and projectile for spinning the latter about said longitudinal axis, a bail pivoted on said frame for rotation about an axis in alignment with one of said transverse axes, means operable to apply a force to said casing adjacent one end thereof, and means mounting said force applying means on said bail for universal angular movement with respect thereto.

9. A ballistics testing instrument as recited in claim 8, and means operable to rotate said bail about its axis at an angular rate varying in accordance with a predetermined function.

10. A ballistics testing instrument as recited in claim 9, said rate being proportional to the square of the cosine of the angle between the plane of said bail and the vertical plane through its axis of rotation.

11. In a ballistics testing machine, a frame, a gimbal ring, first means pivoting said ring in said frame for movement about a normally horizontal first axis, a casing, second means pivoting said casing in said gimbal ring for movement about a second axis normal to said first axis, a projectile-simulating rotor mounted in said casing for spinning about a third axis normal to said second axis, all said axes being concurrent at a first point substantially coincident with the center of gravity of said rotor, said gimbal ring being tubular, said first means including at least one hollow trunnion communicating with the interior of said ring, said second means including at least one hollow trunnion communicating with the interior of said casing, means carried by said casing for forming air jets tangentially impinging said rotor, and means mounted for pivotal movement about an axis through said first point and operable to apply a force to said casing at a second point on the axis of spin of said rotor forwardly removed from said first point.

12. A ballistics testing machine as recited in claim 11, said force-applying means comprising a bail pivoted on said frame on said first axis, a cylinder, means mounting said cylinder on said bail for universal angular movement about a third point radially remote from said first and second points, a piston in said cylinder, a rod connected with said piston, said second point being defined by a ball and socket contact one of which is carried on the end of said rod and the other of which is carried on the end of said casing adjacent the nose of said rotor.

13. In a ballistics testing machine, a frame, a casing, gimbal ring means mounting said casing on said frame for universal angular movement about first and second mutually normal axes, said first axis being normally horizontal, a rotor simulating a projectile, means mounting said rotor within said casing for spinning about its longitudinal axis at right angles to said second axis, cooperating means carried by said casing and rotor for spinning the latter about said longitudinal axis, a bail carried by said frame for pivotal movement about an axis in its plane coincident with said first axis, force-applying means, means mounting said force-applying means on said bail for universal angular movement about a first point fixed with respect to said bail and in radially offset relation with said first axis, said force-applying means being engageable with said casing at a point on the longitudinal axis of said rotor between said first point and first axis, and power means operable to pivot said bail about said first axis at a predetermined rate.

14. A ballistics testing machine comprising a frame, a gimbal ring journaled in said frame for pivotal movement about a first normally horizontal axis, a casing journaled in said gimbal ring for pivotal movement about a second axis normal to said first axis, a projectile-simulating rotor mounted in said casing for spinning about its longitudinal axis normal to said second axis, all said axes being concurrent at a first point substantially coincident with the center of gravity of the combined casing and rotor, a bail pivoted on said frame for angular movement about said first axis, force-applying means mounted on said bail for universal pivotal movement, said force-applying means including a part engaging said casing at a second point on said longitudinal axis forwardly removed from said first point, and means pivoting said bail at a predetermined angular velocity to vary the angular relation between said longitudinal axis and the line of action of said force-applying means.

15. In a ballistics testing instrument, a base, a projectile simulating rotor, means carried by said base and mounting said rotor for spinning about its longitudinal axis and for angular movement about two mutually normal intersecting axes transverse to said longitudinal axis, means for applying a force to said rotor at a point on said longitudinal axis remote from said transverse axes, and means for angularly moving said force-applying means to angularly vary the line of action thereof relatively to said frame.

16. In a ballistics testing instrument, a base, a projectile simulating rotor, means carried by said base and mounting said rotor for spinning about its longitudinal axis and for angular movement about two mutually normal intersecting axes transverse to said longitudinal axis, means operable to apply a force to said rotor at a point on said rotor remote from the plane of said transverse axes, means operable to angularly move said force-applying means about one said transverse axis to angularly move the line of action of the force exerted thereby and at a predetermined angular rate, electromagnetic induction means to determine the speed of spin of said rotor, and including an induction element rotating therewith, and means to record the instantaneous position of the line of action of said force-applying means throughout the range of angular movement thereof.

17. A ballistics testing machine comprising a base, a simulated projectile having known ballistic characteristics representative of those of an actual projectile whose ballistics are to be determined, a hollow gimbal ring, hollow outer trunnions mounting said ring on said base for pivotal movement about a first diametral axis of said ring, a casing, hollow inner trunnions mounting said casing in said ring for pivotal movement about a second diametral axis of said ring normal to said first axis, means journaling said projectile in said casing for spinning about its longitudinal axis normal to said second axis, all said axes being concurrent at the center of gravity of the combined projectile and casing, air turbine means carried by said projectile and comprising a first and second series of circumferentially spaced air pockets, the pockets of one series being axially spaced and oppositely directed from those of the first series, means carried by said casing for forming first jets impinging said first series of pockets to spin said projectile in one direction, means carried by said casing for forming second jets impinging said second series of pockets to spin said projectile in the opposite direction, there being a first air passage to said first jets through one each of said outer and inner trunnions and a portion of said ring, there being a second air passage to said second jets through the other of said outer and inner trunnions and another portion of said ring, said passages being separate and distinct.

18. A machine as recited in claim 17, a bail pivoted on said base for independent pivotal movement about said first diametral axis in the plane of said ring, said first diametral axis being horizontal, resilient means urging said bail into vertical position, an air cylinder, gimbal ring means mounting said cylinder on said bail for universal movement on said bail about a first point above said first diametral axis, a piston in said cylinder, a rod depending from said piston, and universal contact means between said rod and casing at a second point on said longitudinal axis, said second point being between said first point and first diametral axis.

19. A machine as recited in claim 18, a light projector including a flash lamp carried by said air cylinder to project a beam of light parallel with said cylinder and means for supporting a photographic record strip coaxial of said first diametral axis and in closely adjacent relation with said light projector.

ROBERT L. PIGFORD.

References Cited in the file of this patent

UNITED STATES PATENTS

| Number | Name | Date |
|---|---|---|
| 1,560,435 | Sperry | Nov. 3, 1925 |
| 2,327,515 | Ferrone et al. | Aug. 24, 1943 |
| 2,353,150 | Dietz | July 11, 1944 |
| 2,373,024 | Gunn et al. | Apr. 3, 1945 |
| 2,423,831 | Garbarini et al. | July 15, 1947 |
| 2,440,963 | Moore et al. | May 4, 1948 |
| 2,470,773 | Haskins | May 24, 1949 |
| 2,490,574 | Austin | Dec. 6, 1949 |